(12) United States Patent
Miyake et al.

(10) Patent No.: US 11,342,750 B2
(45) Date of Patent: May 24, 2022

(54) POWER DEMAND/SUPPLY ADJUSTMENT POWER PROCUREMENT PLAN SUPPORT DEVICE AND METHOD, AND POWER DEMAND/SUPPLY ADJUSTMENT POWER PROCUREMENT PLAN SUPPORT SYSTEM

(71) Applicant: Hitachi, Ltd., Tokyo (JP)

(72) Inventors: Toshiyuki Miyake, Tokyo (JP); Kenichiro Yamane, Tokyo (JP); Masahiro Yatsu, Tokyo (JP); Taichiro Kawahara, Tokyo (JP); Toshiyuki Sawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 364 days.

(21) Appl. No.: 16/476,309

(22) PCT Filed: Oct. 11, 2017

(86) PCT No.: PCT/JP2017/036801
§ 371 (c)(1),
(2) Date: Jul. 8, 2019

(87) PCT Pub. No.: WO2018/154842
PCT Pub. Date: Aug. 30, 2018

(65) Prior Publication Data
US 2019/0372348 A1    Dec. 5, 2019

(30) Foreign Application Priority Data
Feb. 24, 2017    (JP) .............................. JP2017-033477

(51) Int. Cl.
*H02J 3/24*    (2006.01)
*H02J 3/28*    (2006.01)
*H02J 3/46*    (2006.01)

(52) U.S. Cl.
CPC ...................... *H02J 3/24* (2013.01); *H02J 3/28* (2013.01); *H02J 3/46* (2013.01)

(58) Field of Classification Search
CPC ........ H02J 3/24; H02J 3/28; H02J 3/46; H02J 3/241; H02J 3/003; H02J 3/004;
(Continued)

(56) References Cited

U.S. PATENT DOCUMENTS 6,625,520 B1 *   9/2003   Chen ..................... H02J 3/0012
                                                    700/286
7,313,465 B1 *  12/2007   O'Donnell ............. G06Q 50/06
                                                    700/291
(Continued)

FOREIGN PATENT DOCUMENTS

JP      2005-078170 A      3/2005
JP      2005-287252 A     10/2005
(Continued)

OTHER PUBLICATIONS

International Search Report of PCT/JP2017/036801 dated Dec. 19, 2017.
Extended European Search Report received in corresponding European Application No. 17898166.8 dated Oct. 15, 2020.

*Primary Examiner* — Ziaul Karim
(74) *Attorney, Agent, or Firm* — Mattingly & Malur, PC

(57) ABSTRACT

A power demand/supply adjustment power procurement plan support device supports a power system through a power transaction in the power market and has an added power transmission capacity analysis means and a target power transmittable capacity determination means. The added power transmission capacity analysis means obtains: actual power supply data including a power supply having supplied power to the power system and the actual value of a power supply amount; an actual power system stabilization data including a power supply performing power supply
(Continued)

restriction for power system stabilization, an electric control amount or a customer facility performing a load restriction, and the actual value of a load control amount; and an actual power demand/supply adjustment power procurement data including a procurement amount of the power demand/supply adjustment power of a power supply participating in the power market and the actual value of the total procurement cost.

16 Claims, 8 Drawing Sheets

(58) Field of Classification Search
CPC .... H02J 2310/64; H02J 2203/10; H02J 3/008; H02J 3/38; Y02B 70/3225; Y04S 20/222; Y04S 50/10; G06Q 50/06
See application file for complete search history.

(56) References Cited

U.S. PATENT DOCUMENTS

| | | | |
|---|---|---|---|
| 8,761,954 B2* | 6/2014 | Milosevic | H02J 3/14 700/298 |
| 9,570,909 B2* | 2/2017 | Milosevic | H02J 3/14 |
| 2010/0332373 A1* | 12/2010 | Crabtree | G06Q 40/04 705/37 |
| 2015/0094968 A1* | 4/2015 | Jia | G01R 21/133 702/60 |

FOREIGN PATENT DOCUMENTS

| | | |
|---|---|---|
| JP | 3862970 B2 | 12/2006 |
| JP | 2007-159239 A | 6/2007 |

* cited by examiner

[FIG. 1]
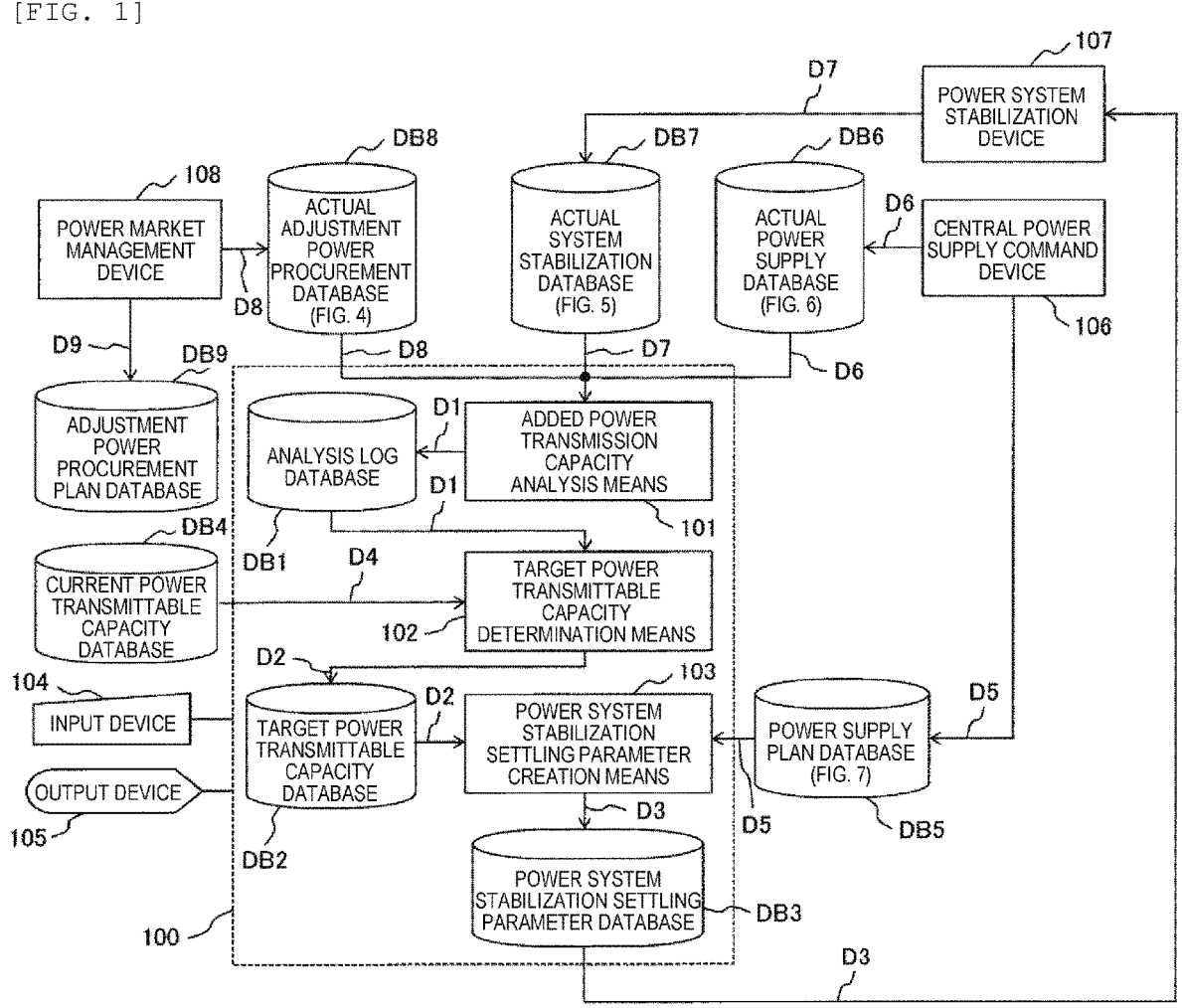

[FIG. 2]
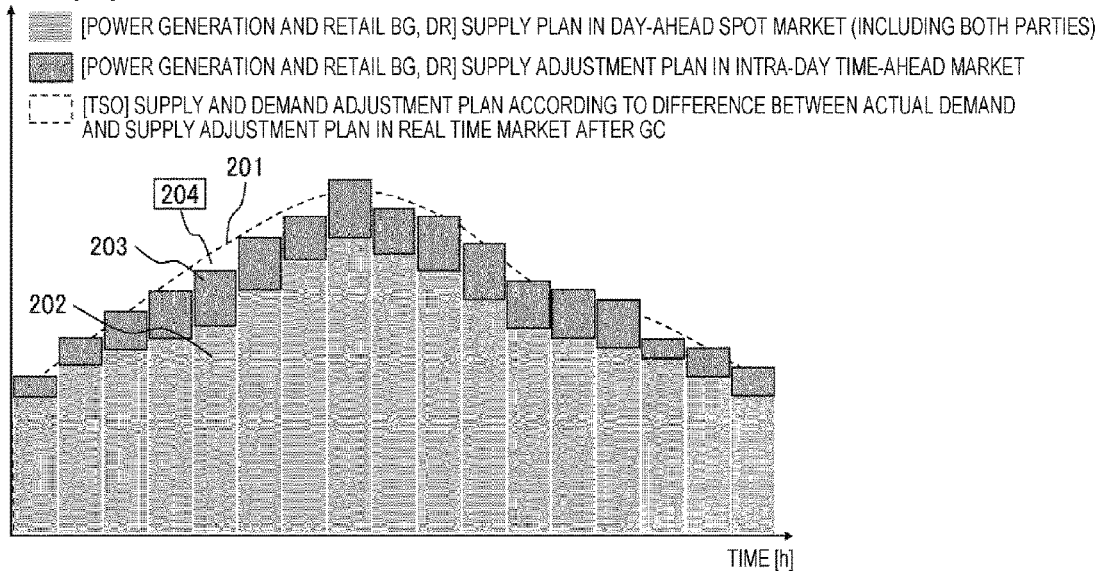
[FIG. 3]
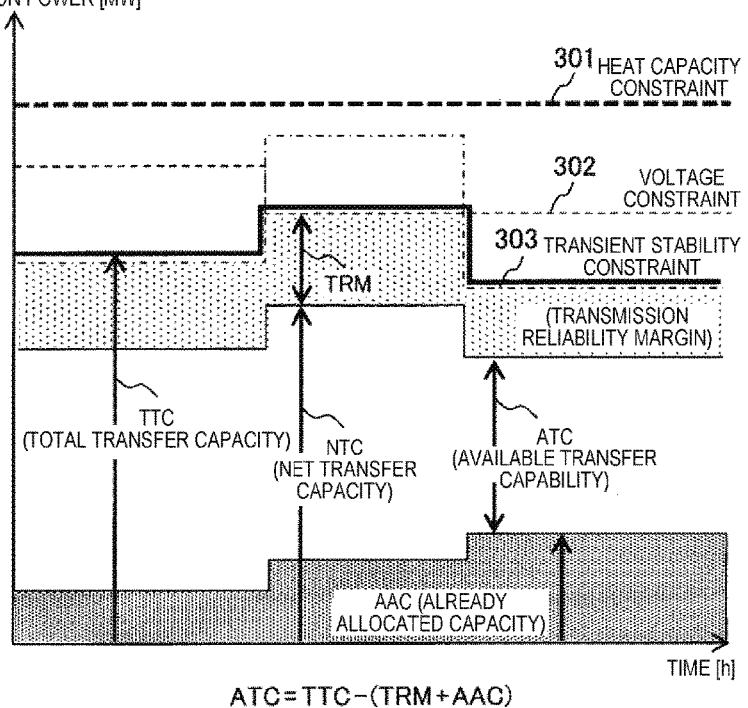

| POWER SUPPLY ID OF ADJUSTMENT POWER (D801) | ELECTRIC ENERGY (D802) | UNIT PRICE (D803) |
|---|---|---|
| POWER SUPPLY A | 50MW | 50YEN/kWh |
| POWER SUPPLY B | 50MW | 55YEN/kWh |
| POWER SUPPLY C | 50MW | 60YEN/kWh |
| POWER SUPPLY D | 50MW | 65YEN/kWh |
| POWER SUPPLY E | 50MW | 70YEN/kWh |
| POWER SUPPLY F | 50MW | 75YEN/kWh |
| POWER SUPPLY G | 50MW | 80YEN/kWh |
| POWER SUPPLY H | 50MW | 85YEN/kWh |
| POWER SUPPLY I | 50MW | 90YEN/kWh |
| ... | ... | ... |
| TOTAL (D804) | 500MW | |

| CASE ID (D701) | ELECTRIC CONTROL POWER SUPPLY ID (D702) | ELECTRIC CONTROL AMOUNT (D703) | LOAD CONTROL FACILITY ID (D704) | LOAD CONTROL AMOUNT (D705) |
|---|---|---|---|---|
| CASE 1 | POWER SUPPLY A | 200MW | FACILITY A | 50MW |
| | POWER SUPPLY B | 300MW | FACILITY B | 60MW |
| | POWER SUPPLY C | 400MW | FACILITY C | 70MW |
| CASE 2 | POWER SUPPLY D | 100MW | FACILITY D | 40MW |
| | POWER SUPPLY E | 200MW | FACILITY E | 50MW |
| | POWER SUPPLY F | 300MW | FACILITY F | 60MW |
| CASE 3 | POWER SUPPLY G | 300MW | FACILITY G | 30MW |
| | POWER SUPPLY H | 400MW | FACILITY H | 40MW |
| | POWER SUPPLY I | 500MW | FACILITY I | 50MW |
| ... | ... | ... | ... | ... |

| POWER FEEDING POWER SUPPLY ID | ACTUAL POWER SUPPLY AMOUNT |
|---|---|
| POWER SUPPLY A | 500MW |
| POWER SUPPLY B | 500MW |
| POWER SUPPLY C | 500MW |
| POWER SUPPLY D | 500MW |
| POWER SUPPLY E | 500MW |
| POWER SUPPLY F | 500MW |
| POWER SUPPLY G | 500MW |
| POWER SUPPLY H | 500MW |
| POWER SUPPLY I | 500MW |
| ... | ... |
| TOTAL ACTUAL AMOUNT | 10000MW |

[FIG. 7]

| POWER FEEDING POWER SUPPLY ID | PLANNED POWER SUPPLY AMOUNT |
|---|---|
| POWER SUPPLY A | 500MW |
| POWER SUPPLY B | 500MW |
| POWER SUPPLY C | 500MW |
| POWER SUPPLY D | 500MW |
| POWER SUPPLY E | 500MW |
| POWER SUPPLY F | 500MW |
| POWER SUPPLY G | 500MW |
| POWER SUPPLY H | 500MW |
| POWER SUPPLY I | 500MW |
| ... | ... |
| PLANNED TOTAL VALUE | 10000MW |

[FIG. 8]
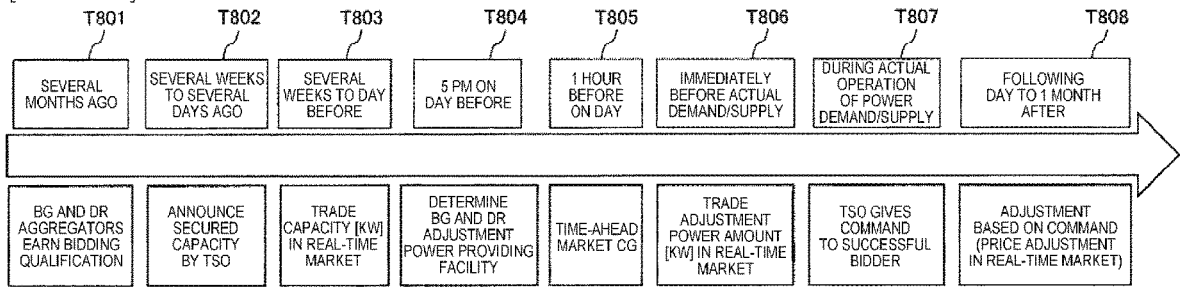
[FIG. 9]
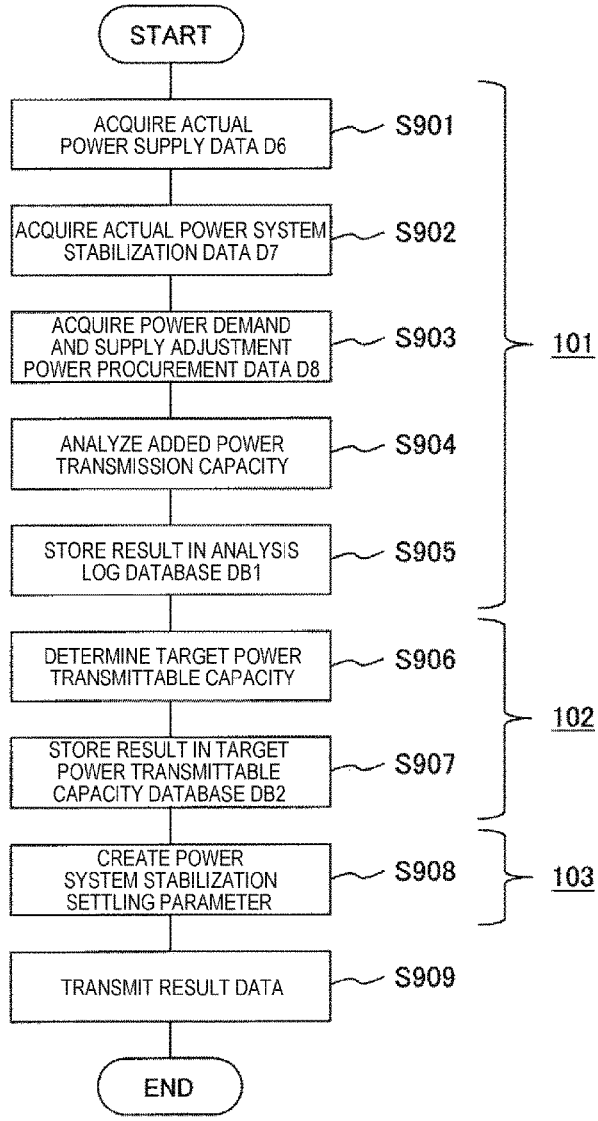

[FIG. 10]
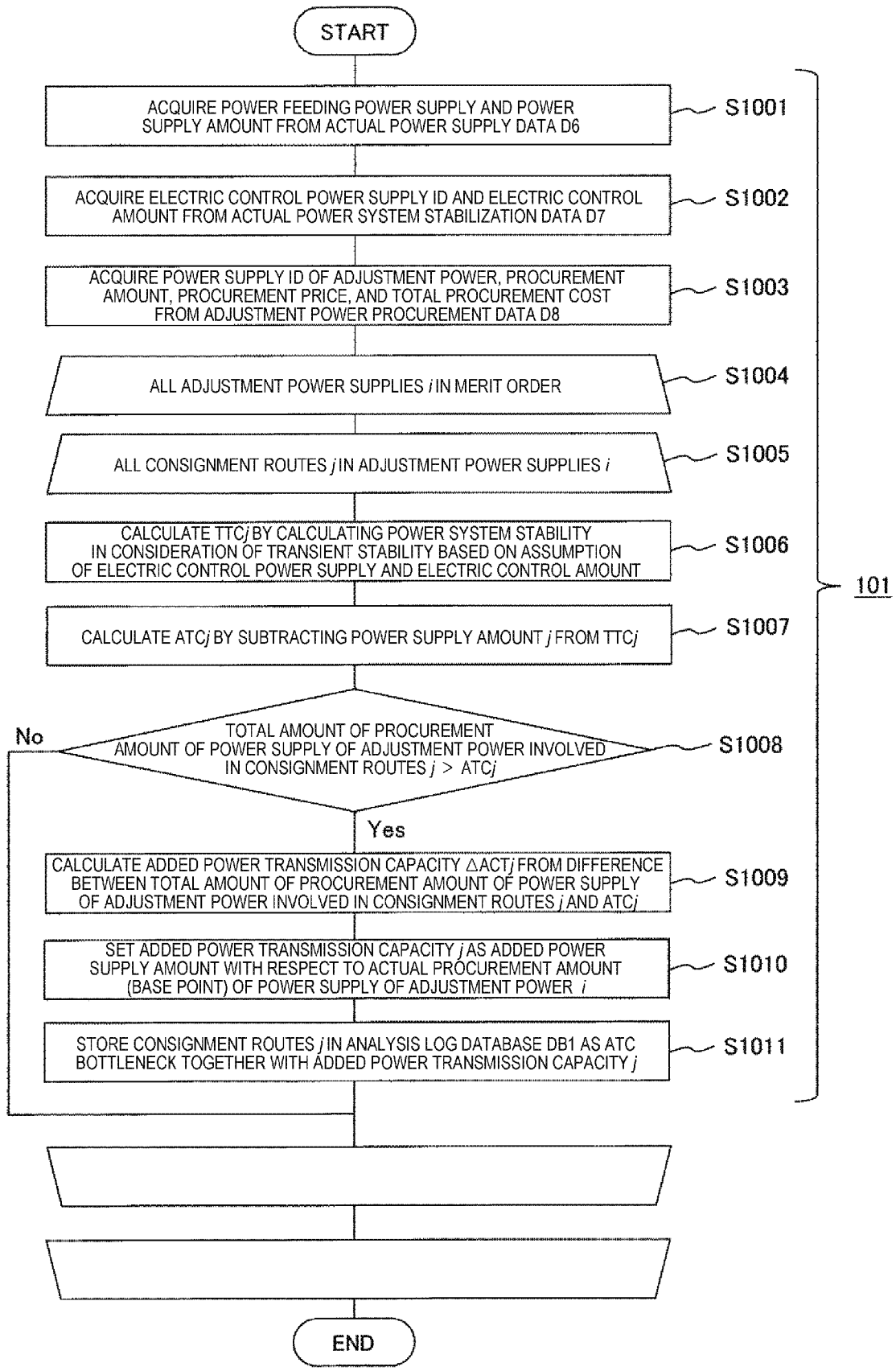

[FIG. 11]
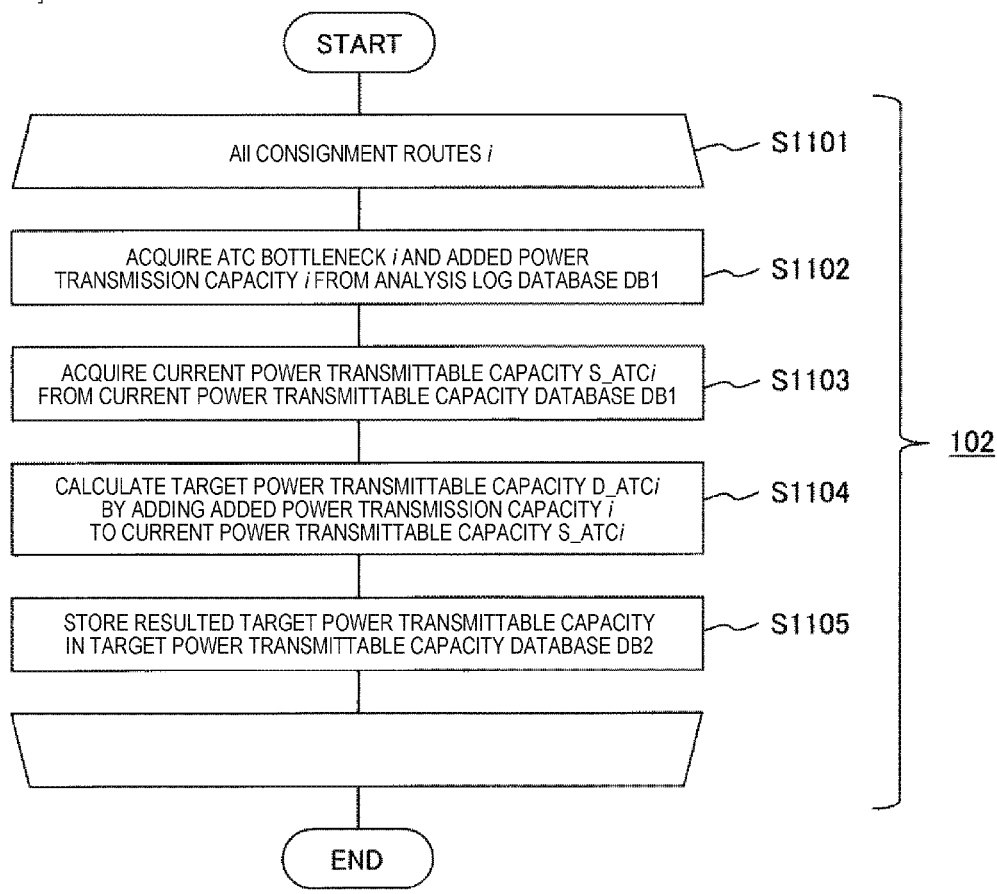

[FIG. 12]
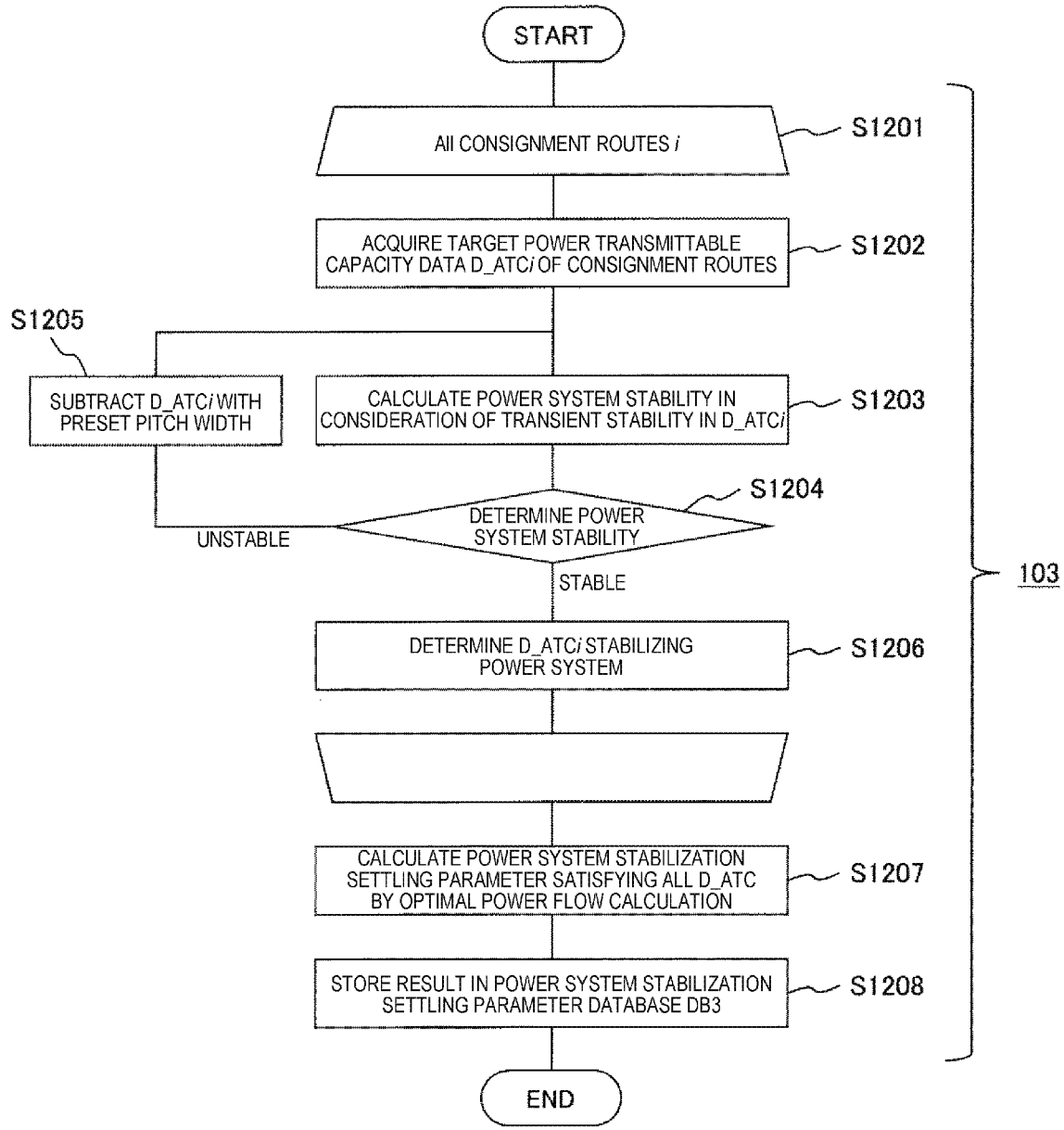

POWER DEMAND/SUPPLY ADJUSTMENT POWER PROCUREMENT PLAN SUPPORT DEVICE AND METHOD, AND POWER DEMAND/SUPPLY ADJUSTMENT POWER PROCUREMENT PLAN SUPPORT SYSTEM

TECHNICAL FIELD

The present invention relates to a power demand/supply adjustment power procurement plan support device and method, and a power demand/supply adjustment power procurement plan support system for securing the supply stability of an electric power system and minimizing the power demand/supply adjustment power procurement cost.

BACKGROUND ART

In the operation of an electric power system, it is necessary to set a so-called "simultaneous same amount" in which the balance of supply and demand is maintained within the permissible range due to a characteristic in that it is not possible to stably supply power when the balance of a supply amount with respect to a power demand amount deviates from a permissible range, and it is not possible to store electric energy. The "simultaneous same amount" in the power demand/supply is legally defined, for example, in Article 2, Sections 4 and 5, Para. 1, Para. 2, and Para. 7 of the Electricity Business Act., in Japan.

In the electric power system, maintenance of a balance of supply and demand of electric power (supply and demand balance) may be broken from a gap of a power supply plan with respect to prediction of a power demand amount (supply shortage caused by power drop, upward swing of demand, and the like). When the supply and demand balance breaks exceeding a certain range, the frequency or voltage of the electric power system varies, an electrical facility of an electric power customer is not normally operated, or the electric power system has even a large power outage in an extreme case, and there is a significant negative influence on the maintenance of power quality of the electric power system. In the related art, thermal power generation or hydropower generation has been used as a power source for supply and demand balance adjustment to eliminate the influence. Recently, there is a concern of addition of a power source that supplies power demand/supply adjustment power for power demand and supply balance adjustment in the electric power system caused by an increase of association with a renewable energy power source in which output variation depends on weather conditions, and an increase in the procurement cost of power demand/supply adjustment power finally added to an electric power customer.

On the other hand, in order to realize both fair use and a stable supply of electric power to all users of electric power systems, many countries working on liberalization of electric power determine the systems and regulations of connection to the electric power system according to the circumstances of each country. This point is described in detail in NPL 1.

In order to establish the system connection of the power supply, it is necessary to disclose in advance the transferable amount of consignment routes or available transfer capacity ATC as a quantitative index of how much electric power can flow where to where in the electric power system, while grasping the demand for electric power changing every moment. In each country, the definition, calculation, and disclosure of power transmittable capacity based on the physical constraints on a stable supply are made. This point is described in detail in NPL 2.

On the other hand, a transmission system operator ISO needs to consider not causing power transmission congestion in which electric power exceeding the power transmittable capacity of consignment routes and interconnection lines flows from a planning stage of power transaction including the power market to a real-time actual supply and demand operation stage.

There, considered are a power transaction auction system that allows effective use of vacant capacity of consignment routes and an interconnection line in consideration of the power transmission congestion as described in PTL 1, and a method of performing a power transaction simulation with high accuracy for a long period of time by taking into account the supply and demand balance of electric power, the consignment route capacity, and the constriction on a power generation facility to support the evaluation of a transaction result and earnings caused by the difference of bidding conditions as described in PTL 2.

In addition, a method of calculating the available transfer capability ATC using optimal power flow calculation in which a dynamic constraint such as transient stability is incorporated while grasping the demand of electric power changing every moment as described in PTL 1 is considered.

CITATION LIST

Patent Literature

PTL 1: JP-A-2005-78170
PTL 2: JP-A-2007-159239
PTL 3: Japanese Patent 3862970

Non-Patent Literature

NPL 1: Technical Report No. 1038: The New Technology of Power System Operation Under Competitive Environment, The Institute of Electrical Engineers of Japan (IEEJ) (2005)
NPL 2: Reference on Capacity Ensuring Rules, Electricity Business Committee Basic Issue Subcommittee of Market Environment Improvement WG (2003)

SUMMARY OF INVENTION

Technical Problem

In the present invention, a power transmission section in which a predetermined power supply supplies the only required amount of power demand/supply adjustment power by the generation of power transmission congestion and the addition of power transmittable capacity is called a power transmission bottleneck. When the power transmission bottleneck occurs, there is a possibility that the transmission system operator may not receive the supply of power demand/supply adjustment power from the low-cost power supply in the actual supply and demand stage. It is desirable that the transmission system operator can identify a part of the consignment route that becomes the power transmission bottleneck for each future time section while predicting the power demand and supply balance from the planning stage of procurement of power demand/supply adjustment power to the actual adjustment stage. It is necessary to set a procurement plan of power demand/supply adjustment power at a lower cost by solving the above problem. This is because the transmission system operator needs to operate the supply and demand adjustment procurement business with adequacy since the power demand/supply adjustment power procurement cost is charged to the transfer fee and is reflected in the electricity fee of an electric power customer.

Regarding the above point, PTL 1 discloses that the market is divided by a consignment route which becomes a power transmission bottleneck where power transmission congestion occurs to establish a transaction to each market. However, by doing this, the market is divided and thus it may not be possible to procure the power demand/supply adjustment power of a power supply with a lower power generation price beyond the power transmission bottleneck.

Regarding the above point, PTL 2 discloses that price determination in the electric power market is made in consideration of the occurrence of power transmission bottleneck and constraints of power generation facilities. However, by doing this, lowering the price is limited to the portion of power transmission bottleneck and the constraints of the power generation facilities, and thus it may not be possible to procure the power demand/supply adjustment power by a power supply with a really low power generation price.

Regarding the above point, PTL 3 discloses that the power transmittable capacity is calculated by using optimal power flow calculation in consideration of the transient stability of the system, and the power transmission bottleneck is not eliminated.

The present invention has been proposed to solve the above problems and an object thereof is to provide a power demand/supply adjustment power procurement plan support device and a method, and a power demand/supply adjustment power procurement plan support system which solve a power transmission bottleneck due to power transmission congestion and support a power demand/supply adjustment power procurement plan in the market at a lower cost.

Solution to Problem

In order to achieve the above object, the present invention provides "a power demand/supply adjustment power procurement plan support device that supports a power demand/supply adjustment power procurement plan of a power system through a power transaction in the power market, the device including:

an added power transmission capacity analysis means that obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity; and a target power transmittable capacity determination means that determines a target power transmittable capacity for minimizing the total procurement cost from a current power transmittable capacity and a power supply plan, based on the added power transmission capacity obtained from the added power transmission capacity analysis means".

In addition, the present invention also provides "a power demand/supply adjustment power procurement plan support system including: a power market management device that performs management and operation of transaction in a power market; a power system stabilization device that secures system stability at the time of an accident of a power system; a central power supply command device that performs planning of the supply of electric power or gives a power supply command with respect to power demand of the power system; and a power demand/supply adjustment power procurement plan support device that supports a power demand/supply adjustment power procurement plan of the power system, in which the power demand/supply adjustment power procurement plan support device includes an added power transmission capacity analysis means that performs added power transmission capacity analysis on a power transmittable capacity of each consignment route of the power system and the power supply amount of each power supply in the total procurement cost of the power demand/supply adjustment power using actual power supply data including a power supply having supplied power to a power system and an actual value of a power supply amount, which are obtained from the central power supply command device, actual power system stabilization data including a power supply performing power supply restriction for power system stabilization and an electric control amount, or an electric power customer facility performing a load restriction and an actual value of a load control amount, which are obtained from the power system stabilization device, and actual power demand/supply adjustment power procurement data including a procurement amount of power demand/supply adjustment power of a power supply participating in the power market and an actual value of a total procurement cost, which are obtained from the power market management device, to obtain an added power transmission capacity, a target power transmittable capacity determination means that determines a target power transmittable capacity for minimizing the total procurement cost from a current power transmittable capacity and a power supply plan based on the added power transmission capacity obtained from the added power transmission capacity analysis means, and a power system stabilization settling parameter creation means that creates a power system stabilization settling parameter for performing power system stabilization measures based on the target power transmittable capacity from the target power transmittable capacity database, the central power supply command device performs planning of the supply of electric power or gives a power supply command with respect to power demand of the power system according to the target power transmittable capacity determined by the target power transmittable capacity determination means and sends the actual power supply data to the power demand/supply adjustment power procurement plan support device, and the power system stabilization device secures system stability at the time of an accident of a power system according to the power system stabilization settling parameter determined by the power system stabilization settling parameter creation means and sends the actual power system stabilization data including a power supply performing power supply restriction for power system stabilization, an electric control amount or an electric power customer facility performing a load restriction, and an actual value of a load control amount to the power demand/supply adjustment power procurement plan support device".

In addition, the present invention also provides "a power demand/supply adjustment power procurement plan support method using a power market management device that performs management and operation of transaction in a power market, a power system stabilization device that secures system stability at the time of an accident of a power system, a central power supply command device that performs planning of the supply of electric power or gives a power supply command with respect to power demand of the power system, and a power demand/supply adjustment power procurement plan support device that supports a power demand/supply adjustment power procurement plan of the power system, in which the power demand/supply adjustment power procurement plan support device performs added power transmission capacity analysis on a power transmittable capacity of each consignment route of the power system and the power supply amount of each power supply in the total procurement cost of the power demand/supply adjustment power using actual power supply data including a power supply having supplied power to a power system and an actual value of a power supply amount, which are obtained from the central power supply command device, actual power system stabilization data including a power supply performing power supply restriction for power system stabilization and an electric control amount, or a customer facility performing a load restriction and an actual value of a load control amount, which are obtained from the power system stabilization device, and actual power demand/supply adjustment power procurement data including a procurement amount of power demand/supply adjustment power of a power supply participating in the power market and an actual value of a total procurement cost, which obtained from the power market management device, to obtain an added power transmission capacity, determines a target power transmittable capacity for minimizing the total procurement cost from a current power transmittable capacity and a power supply plan based on the added power transmission capacity, and creates a power system stabilization settling parameter for performing power system stabilization measures based on the target power transmittable capacity, the central power supply command device performs planning of the supply of electric power or gives an electric power supply command with respect to the power demand of the power system according to the target power transmittable capacity and sends the actual power supply data to the power demand/supply adjustment power procurement plan support device, and the power system stabilization device secures system stability at the time of an accident of the power system according to the power system stabilization settling parameter and sends the actual power system stabilization data including a power supply performing power supply restriction for power system stabilization, an electric control amount or an electric power customer facility performing a load restriction, and an actual value of a load control amount to the power demand/supply adjustment power procurement plan support device".

Advantageous Effects of Invention

According to the present invention, in a state where a power transmission bottleneck is caused by power transmission congestion in a power system, it is possible to eliminate the power transmission bottleneck and to set a power demand/supply adjustment power procurement plan at a lower cost.

More specifically, according to the embodiments of the present invention, it is possible to set a power demand/supply adjustment power procurement plan at a lower cost by generating a target power transmittable capacity value such that the procurement cost of adjustment power is further reduced by extracting a power transmission bottleneck, and supporting the operation of a power system stabilization system to be closer to the target power transmittable capacity value in cooperation with the power system stabilization system and a power generation plan system.

BRIEF DESCRIPTION OF DRAWINGS

FIG. 1 is a diagram illustrating the overall configuration of a power demand/supply adjustment power procurement plan system including a power demand/supply adjustment power procurement plan support device.

FIG. 2 is a diagram illustrating the relationship between daily demand prediction, a supply plan, and a demand/support adjustment plan.

FIG. 3 is a diagram illustrating a power transmittable capacity of time series in a consignment route of a power system or an interconnection line.

FIG. 4 is a diagram illustrating an example of actual adjustment power procurement data D8 of power demand/supply adjustment obtained from a power market management device.

FIG. 5 is a diagram illustrating an example of actual power system stabilization data D7 obtained from a power system stability device.

FIG. 6 is a diagram illustrating an example of actual power supply data D6 obtained from a central power supply command device.

FIG. 7 is a diagram illustrating an example of power supply plan data D5 obtained from the central power supply command device.

FIG. 8 is a schematic diagram illustrating a transaction schedule in the real-time market.

FIG. 9 is a diagram illustrating the overall process flow of the power demand/supply adjustment power procurement plan support device.

FIG. 10 is a diagram illustrating a detailed process flow of an added power transmission capacity analysis means.

FIG. 11 is a diagram illustrating a detailed process flow of a target power transmittable capacity determination means.

FIG. 12 is a diagram illustrating a detailed process flow of a power system stabilization settling parameter creation means.

DESCRIPTION OF EMBODIMENTS

Hereinafter, embodiments of the present invention will be described with reference to the drawings.

Embodiments

FIG. 1 is a block diagram illustrating the overall configuration of a power demand/supply adjustment power procurement plan system including a power demand/supply adjustment power procurement plan support device according to an embodiment of the present invention.

In FIG. 1, the power demand/supply adjustment power procurement plan system is configured to mainly include a power demand/supply adjustment power procurement plan support device 100, a power system stabilization device 107 arranged around the power demand/supply adjustment power procurement plan support device 100, a central power supply command device 106, and a power market management device 108, and these devices are connected via a communication network. The power demand/supply adjustment power procurement plan support device 100 cooperates with the power system stabilization device 107, the central power supply command device 106, and the power market management device 108, and various databases attached to these devices, and supports a power demand/supply adjustment power procurement plan by a transmission system operator.

The power demand/supply adjustment power procurement plan support device 100 is configured as a so-called calculation system, but, when describing internal processing functions thereof as means, includes an added power transmission capacity analysis means 101, a target power transmittable capacity determination means 102, and a power system stabilization settling parameter creation means 103. In addition, the power demand/supply adjustment power procurement plan support device 100 is connected to an input device 104 and an output device 105 as appropriate to be used.

In addition, the power demand/supply adjustment power procurement plan support device 100 stores various databases DB therein and these databases are an analysis log database DB1, a target power transmittable capacity database DB2, a power system stabilization settling parameter database DB3, and the like. Information stored in these databases DB1, DB2, and DB3 in the power demand/supply adjustment power procurement plan support device 100 can be regarded as secondary data obtained by processing data from the outside in the added power transmission capacity analysis means 101, the target power transmittable capacity determination means 102, and the power system stabilization settling parameter creation means 103.

The power demand/supply adjustment power procurement plan support device 100 is connected to various external databases via a communication network capable of transmitting and receiving data. The various external databases in FIG. 1 are a current power transmittable capacity database DB4, a power generation plan database DB5, an actual power supply database DB6, an actual power system stabilization database DB7, an actual power demand/supply adjustment bidding database DB8, and an adjustment power procurement plan database DB9.

Among the external databases, the actual power supply database DB6 and the power supply plan database DB5 holds data from the central power supply command device 106, and the actual power system stabilization database DB7 holds data from the power system stabilization device 107, and the actual adjustment power procurement database DB8 and the adjustment power procurement plan database DB9 hold data from the power market management device 108.

Among the internal databases, target power transmittable capacity data D2 accumulated in the target power transmittable capacity database DB2 is sent to the central power supply command device 106, and power system stabilization settling parameter data D3 accumulated in the power system stabilization settling parameter database DB3 is sent to the power system stabilization device 107 to be used. For this purpose, a communication network capable of transmitting and receiving data is appropriately configured and connected.

According to the configuration in FIG. 1, in the power demand/supply adjustment power procurement plan support device 100, the added power transmission capacity analysis means 101 acquires actual power supply data D6 from actual power supply database DB6, the actual power system stabilization data D7 from the actual power system stabilization database DB7, and the actual adjustment power procurement data D8 from the actual adjustment power procurement database DB8; creates added power transmission capacity data D1; and stores the data in the analysis log database DB1.

In the power demand/supply adjustment power procurement plan support device 100, the target power transmittable capacity determination means 102 acquires the added power transmission capacity data D1 from the analysis log database DB1, creates target power transmittable capacity data D2, and stores the data in the target power transmittable capacity database DB2. The target power transmittable capacity determination means 102 refers to current power transmittable capacity data D4 accumulated in the current power transmittable capacity database DB4 when creating the target power transmittable capacity database DB2.

In the power demand/supply adjustment power procurement plan support device 100, the power system stabilization settling parameter creation means 103 acquires the target power transmittable capacity data D2 from the target power transmittable capacity database DB2, creates the power system stabilization settling parameter data D3, and stores the data in the power system stabilization settling parameter database DB3.

The central power supply command device 106 creates power supply plan data D5, stores the data in the power supply plan database DB5, creates the actual power system stabilization data D6, and stores the data in the actual power supply database DB6.

The power system stabilization device 107 acquires the power system stabilization settling parameter data D3 from the power system stabilization settling parameter database DB3 in the power demand/supply adjustment power procurement plan support device 100, creates the actual power system stabilization data D7, and registers the data in the actual power system stabilization database DB7.

The power market management device 108 creates the actual adjustment power procurement data D8 to store the data in the actual adjustment power procurement database DB8, and creates adjustment power procurement plan data D9 to store the data in the adjustment power procurement plan database DB9.

The input device 104 is an interface for carrying out a predetermined instruction to the power demand/supply adjustment power procurement plan support device 100 by a user. For example, the input device 104 is constituted by a keyboard, a mouse, a touch panel and/or a button, and the like.

The output device 105 is an interface for providing predetermined information from the power demand/supply adjustment power procurement plan support device 100 by a user. For example, the output device 105 is constituted by a display and the like.

For example, the functions of the respective means 101 to 103 constituting the power demand/supply adjustment power procurement plan support device 100 are realized using a central processing unit (CPU), a memory, and a storage device (none of the above are shown in the drawings). For example, the CPU realizes the functions regarding the respective means 101 to 103 by reading out a predetermined computer program from the storage device in the memory.

FIG. 2 is a diagram illustrating the relationship between daily demand prediction, a supply plan, and a demand/support adjustment plan according to the embodiment of the present invention. FIG. 2 illustrates that demand and supply are equal, that is, the simultaneous same amount is realized by an expected daily actual demand change (daily demand prediction) 201 of a certain power system, a supply plan 202 in which a balancing group BG constituted of one or more power generation companies and retailers, and a DR aggregator that aggregates demand responses DR (also referred to as negawatt power) of electric power customers perform power transaction in the day-ahead spot market, a supply adjustment plan 203 in which the balancing group BG and the DR aggregator perform procurement in the intra-day time-ahead market similarly, and a demand and supply adjustment plan 204 in which the transmission system operator performs procurement in the real-time market according to a difference between the actual demand and the supply adjustment plan after gate close GC (which is the deadline time for bidding and bidding amount change on the intra-day time-ahead market, and is set to, for example, one hour before the actual demand and supply) in these markets.

The present invention is directed to how to reduce the procurement cost of power demand/supply adjustment power in the demand and supply adjustment plan 204 in which the transmission system operator performs procurement in the real-time market. The power market management device 108 in FIG. 1 is a device mainly managed and operated by, for example, a market manager such as Japan Electric Power Exchange or a transmission system operator, and has a function of aggregating bids for selling and bids for buying of a power generation side balancing group BG and a demand response side DR aggregator who are participants in the power market, and a transmission system operator, and determining a successfully bid power supply based on the price determination standard, for example, in order of low bidding price, a so-called merit order.

FIG. 3 is a diagram illustrating a power transmittable capacity of time series in a consignment route or an interconnection line of a power system according to the embodiment of the present invention. In the consignment route and the interconnection line of the power system, the following three constraints are provided as supply reliability conditions.

The first is a heat capacity constraint 301 that power interchange should not be performed beyond the rated capacity in all consignment routes. The second is a voltage constraint 302 that all the bus voltage should not exceed the set range. The third is a transient stability constraint 303 that a phase difference between buses should not exceed a fixed range in order to maintain transient stability with respect to a system accident.

Generally, the heat capacity constraint 301 indicated by a thick dotted line is a constraint that the consignment routes are damaged when the power transmission amount is further increased, and is a fixed time constraint. In contrast, the voltage constraint 302 indicated by a thin dotted line and the transient stability constraint 303 indicated by a dashed line indicate a constantly changing constraint reflecting the tidal current state of a system that changes every moment.

That is, the total transfer capacity TTC satisfying the most severe constraint among the three constraints is determined by a constraint condition indicating a smaller value at each time between the voltage constraint 302 indicated by the thin dotted line and the transient stability constraint 303 indicated by the dashed line, and constantly changes reflecting the system state which changes every moment. The total transfer capacity TTC is indicated by a thick solid line in FIG. 3.

In addition, FIG. 3 indicates a relationship that a net transfer capacity NTC is obtained by subtracting a transmission reliability margin TRM corresponding to an uncertain element of the load due to influences such as changes in the weather and economic fluctuations from the total transfer capacity TTC, and is subtracted again by an AAC (NTC: Already Allocated Capacity) to become the available transfer capacity ATC.

According to the relationship in FIG. 3, it is considered that the total transfer capacity TTC of the time section determined by the transient stability constraint at the normal time is improved by introducing the power system stabilization device that guarantees transient stability by measures of electric control (power supply restriction control) or load control (load restriction control) at the time of an accident. In addition, it is considered that when the trip of the consignment route and the power supply or load demand is rapidly increased, the total transfer capacity TTC determined by the voltage constraint at the normal time is improved by introducing a voltage/reactive power control device that controls voltage/reactive power to be within a specified range at a predetermined observation point.

The present invention makes it possible to procure power demand/supply adjustment power at a lower cost in the system into which the power system stabilization device capable of improving the total transfer capacity TTC determined by the transient stability constraint 303 or the voltage constraint 302 is introduced.

FIG. 4 is a diagram illustrating an example of the actual adjustment power procurement data D8 of power demand/supply adjustment obtained from the power market management device 108 according to the embodiment of the present invention. The actual adjustment power procurement data D8 includes D801 indicating a power supply ID of adjustment power, an electric energy D802, a unit price D803, and a total procurement cost D804, and here, specific power supply names and electric energy thereof, and the power unit price are presented comparably.

The power supply providing power demand/supply adjustment power in the real-time market is a power supply that can be controlled online by a transmission system operator at the time of actual supply and demand, and for a capacity equivalent [kW] of power demand/supply adjustment power publicly announced and bid for buying in advance as necessary, for example, from several months before the actual supply and demand, tendering is performed at a capacity unit price [kW], for example, of the annual offer to determine a power supply of a successful bidder in order of low capacity unit price [kW] according to a predetermined standard, for example, a merit order, that is, in order of low unit price. Such power supplies are classified into a power supply which is necessarily provided with a frequency adjustment function (referred to as "power supply of peak adjustment power"), a power supply which is not necessarily provided with a frequency adjustment function (referred to as "power supply of demand and supply balance adjustment power"), and a power supply which corresponds to a rare frequency when the weather rapidly changes (rare frequency corresponding power supply).

For the power supply providing power demand/supply adjustment power that allows bidding in the real-time market, for example, in addition to the power supply for the capacity equivalent [kW] publicly announced in advance as necessary by the transmission system operator, a power supply that has already bid in the day-ahead spot market or in the intra-day time-ahead market, is planned to provide the supply power and is considered to have a surplus power in the actual supply and demand can be bid for selling. As such a power supply, tendering is performed at the offered electric energy [kWh] unit price with respect to the electric energy of the power demand/supply adjustment power bid for buying by a transmission system operator in the real-time market to determine a power supply of a successful bidder according to a predetermined standard, for example, a merit order, that is, in order of low unit price.

FIG. 5 is a diagram illustrating an example of the actual power system stabilization data D7 obtained from the power system stability device 105 according to the embodiment of the present invention. The actual power system stabilization data D7 is constituted of D701 indicating a case ID, D702 indicating an electric control power supply ID, an electric control amount D703, D704 indicating a load control facility ID of an electric power customer performing load restriction, and a load control amount D705.

A method in which the electric control and the load control are calculated and settled with offline data as control output candidates corresponding to preset accident modes and system states by the power system stabilization device 105, the control output candidates are referred to at the time of occurrence of an accident, and the contents thereof are executed is adopted. In addition, the power system stabilization device 105 may calculate and settle the electric control and the load control with online data, for example, with a period of several minutes, as control output candidates corresponding to preset accident modes and system states, refer to the control output candidates at the time of occurrence of an accident, and execute the contents thereof. In addition, the power system stabilization device 105 may adopt a method in which a prediction operation is performed in real time for an electrical phenomenon during the accident and after the accident, and the stabilization control for the electric control or the load restriction is immediately executed based on the result. Further, the power system stabilization device 105 may adopt a method of detecting a ripple phenomenon and executing a preset control.

FIG. 6 is a diagram indicating an example of the actual power supply data D6 obtained from the central power supply command device 106 according to the embodiment of the present invention. The actual power supply data D6 is constituted of D601 indicating a power feeding power supply ID, an actual power supply amount D602, and a total actual power supply amount D603.

FIG. 7 is a diagram illustrating an example of the power supply plan data D5 obtained from the central power supply command device 106 according to the embodiment of the present invention. The power supply plan data D6 includes D701 indicating a power feeding power supply ID, a power supply amount at planning D702, and a total power supply amount at planning D703.

The central power supply command device 106 can determine the output of power supply series and determine the number of power supply units belonging to the power supply series based on an economic indicator such as fuel unit price. The central power supply command device 106 outputs the power generation output command to each of a plurality of power plants from the central power supply command device 106 that performs overall management of the power system and performs start or stop of the power supply of the power plant or increase or decrease in the output according to the fluctuation of the system frequency, based on the predicted demand curve of electric power in the power system, the power supply data of the power plant, and the like. Here, generally, one central power supply command device 106 is provided in the power system controlled by a transmission system operator, and performs overall management of the power system to control power demand and supply of the power system. The central power supply command device 106 plays a role of maintaining a balance between demand and supply by giving a power supply command based on the supply plan 202, the supply adjustment plan 203, and the demand and supply adjustment plan 204 illustrated in FIG. 2.

FIG. 8 is a schematic diagram of a transaction schedule in the real-time market according to the embodiment of the present invention.

In FIG. 8, market participants such as the balancing group BG and the DR aggregator are needed to acquire bidding qualification presented by the market manager or the transmission system operator, for example, several months T801 before the actual operation time T807 when the transmission system operator gives a power supply command. In addition, it is necessary that the market participants such as the balancing group BG and the DR aggregator are needed to install communication facilities that can comply with the power supply command from the transmission system operator until the actual operation T807. For example, several weeks to several days T802 before the actual operation time T807, the secured capacity of the power demand/supply adjustment power is announced publicly by the transmission system operator. For example, several weeks before the actual operation time T806 to the day before T803, in the real-time market, there is a transaction such as a tender of the balancing group BG for a bid for buying of the transmission system operator. For example, at 17:00 on the day before 804, the adjustment power providing a power supply of the balancing group BG is determined. There is gate closing GC, which means the transaction end of the time-ahead market, 1 hour before on the day T805. Until the actual operation time after the gate closing GC T806, in the real-time market, for example, from the next day to 1 month after the actual operation time T807, the power demand/supply adjustment power fee is settled between the transmission system operator and the balancing group BG or the DR aggregator based on the power supply command, and for example, the highest bidding price of the power supply of adjustment power is paid to all power supplies as a real-time price. According to the transaction schedule as illustrated in FIG. 8, the transaction of power demand/supply adjustment power is performed.

FIG. 9 is a diagram illustrating the overall process flow of the power demand/supply adjustment power procurement plan support device 100 according to the embodiment of the present invention.

The added power transmission capacity analysis means 101 of the power demand/supply adjustment power procurement plan support device 100 illustrated in FIG. 1 acquires the actual power supply data D6 from the actual power supply database DB6 (process step S901), acquires the actual power system stabilization data D7 from the actual power system stabilization database DB7 (process step S902), acquires the actual adjustment power procurement data D8 from the actual adjustment power procurement database DB8 (process step S903), performs added power transmission capacity analysis (process step S904), and stores the added power transmission capacity data D1 as a result in the analysis log database DB1 (process step S905).

The target power transmittable capacity determination means 102 acquires the added power transmission capacity data D1 from the analysis log database DB1, acquires the current power transmittable capacity data D4 from the current power transmittable capacity database DB4, calculates the target power transmittable capacity data D2 (process step S906), and stores the result in the target power transmittable capacity database DB2 (process step S907).

Subsequently, the power system stabilization settling parameter creation means 103 acquires the target power transmittable capacity data D2 from the target power transmittable capacity database DB2, acquires the power supply plan data D5 from the power supply plan database DB5, creates the power system stabilization settling parameter D3 (process step S807), and stores the result in the power system stabilization settling parameter database DB3 (process step S908).

The power demand/supply adjustment power procurement plan support device 100 transmits the target power transmittable capacity data D2 of the target power transmittable capacity database DB2 to the central power supply command device 106 and transmits the power system stabilization settling parameter data D3 of the power system stabilization settling parameter database DB3 to the power system stabilization device 107 as results of the above process (process step S909).

FIG. 10 is a diagram illustrating a detailed process flow of the added power transmission capacity analysis means 101 of the power demand/supply adjustment power procurement plan support device 100 according to the embodiment of the present invention.

In the process flow illustrated in FIG. 10, D601 indicating the power feeding power supply ID and the power supply amount D602 are acquired from the actual power supply data D6 illustrated in FIG. 6 (process step S1001); D702 indicating the electric control power supply ID and the electric control amount D703, or D704 indicating the load control facility ID and the load control amount D705 are acquired from the actual power system stabilization data D7 illustrated in FIG. 5 (process step S1002); D801 indicating the power supply ID of adjustment power, the procurement amount (electric energy) D802, the procurement price D803, and the total procurement cost D804 are acquired from the actual adjustment power procurement data D8 illustrated in FIG. 4 (process step S1003); the electric control amounts are assumed with respect to all the consignment routes (process step S1004) and the power supply of adjustment power (process step S1005) and then a total transfer capacity TTCj of a j-th consignment route is calculated by power system stability calculation in consideration of transient stability (process step S1006); ATCj is calculated by subtracting the power supply amount j from TTCj (process step S1007); whether or not the total procurement amount of the power supply of adjustment power involved in the consignment route j is larger than ATCj is determined (process step S1008); when the total procurement amount of the power supply of adjustment power involved in the consignment route j is larger than ATCj, an added power transmission capacity ΔATCj is calculated from a difference between the total procurement amount of the power supply of adjustment power involved in the consignment route j and ATCj (process step S1009); the added power transmission capacity ΔATCj is set as an added power supply amount with respect to an actual procurement amount (referred to as a base point) of a power supply of adjustment power i (process step S1010); and the consignment route j is stored as an ATC bottleneck in the analysis log database DB1 together with an added power transmission capacity j as data D1 (process step S1011). The processes from the process step S1004 to the process step S1007 are repeatedly performed until the added power transmission capacity with respect to all the consignment routes is obtained. In the process step S1005, instead of considering transient stability, power system stability calculation considering steady-state stability and voltage stability may be used.

FIG. 11 is a diagram illustrating a detailed process flow of the target power transmittable capacity determination means 102 of the power demand/supply adjustment power procurement plan support device 100 according to the embodiment of the present invention.

In the process flow illustrated in FIG. 11, the added power transmission amount j of the ATC bottleneck with respect to all the consignment routes (process step S1101) is acquired from the analysis log database DB1 (process step S1102); a current power transmittable capacity S_ATCi of a consignment route i is acquired from the from the current power transmittable capacity database DB4 (process step S1103); an added power transmission amount i is added to the current power transmittable capacity S_ATCi (process step S1104); and a resulted target power transmittable capacity D_ATCi is stored in the target power transmittable capacity database DB2 as the target power transmittable capacity data D2 (process step S1105). The processes from the process step S1101 to the process step S1105 are repeatedly performed until the target power transmittable capacity data D2 with respect to all the consignment routes is obtained.

For the current power transmittable capacity database DB4, for example, power transmittable capacity released by a power system simultaneous information disclosure system or the like may be used. Alternatively, data calculated in real time by an existing power transmittable capacity calculating device or the like may be used.

FIG. 12 is a diagram illustrating a detailed process flow of the power system stabilization settling parameter creation means 103 of the power demand/supply adjustment power procurement plan support device 100 according to the embodiment of the present invention.

In the process flow illustrated in FIG. 12, with respect to all the consignment routes (process step S1201), data D_ATCi is acquired from the target power transmittable capacity database DB2 as the target power transmittable capacity data D2 of the consignment route i (process step S1202); the system stability considering, for example, transient stability is calculated in the target power transmittable capacity D_ATCi (process step S1203); the system stability is determined (process step S1204); the data D_ATCi is subtracted with a preset pitch width (process step S1205) when the determination result is unstable; and the process step S1203 is repeatedly performed. When the system stability is stable in the process step S1104, the data D_ATCi which is the target power transmittable capacity data D2 is determined as a stable power transmittable capacity (process step S1206); as power system stabilization settling parameters satisfying all data D_ATC, for example, the power supply for electric control and the electric control amount thereof are calculated by, for example, optimal power flow calculation OPF considering transient stability (process step S1207); and the result is stored in the power system stabilization settling parameter database DB3 (process step S1208). In the process step S1203 and the process step S1207, instead of considering transient stability, the optimal power flow calculation OPF considering steady-state stability and voltage stability may be used.

The power demand/supply adjustment power procurement plan support device 100 according to the embodiment of the present invention may be displayed using the numerical values, the thickness, and the color of the consignment routes, and other visually distinguishable expressions to be drawn on the power system diagram so that the current power transmittable capacity data D4 acquired from the current power transmittable capacity database DB4 and the target power transmittable capacity data D2 of the target power transmittable capacity database DB2 for each consignment route in the power system can be compared with each other and may be output by the output device 105 in FIG. 1. In addition, the added transmission capacity for each consignment route acquired from the analysis log database DB1 may be displayed using numerical values or other visually distinguishable expressions.

REFERENCE SIGNS LIST

100: power demand/supply adjustment power procurement plan support device
101: added power transmission capacity analysis means
102: target power transmittable capacity determination means
103: power system stabilization settling parameter creation means
104: input device
105: output device
106: central power supply command device
107: power system stabilization device
108: power market management device
DB1: analysis log database
DB2: target power transmittable capacity database
DB3: power system stabilization settling parameter database
DB4: current power transmittable capacity database
DB5: power supply plan database
DB6: actual power supply database
DB7: actual power system stabilization database
DB8: actual adjustment power procurement database
DB9: adjustment power procurement plan database

The invention claimed is:

1. A power demand/supply adjustment power procurement plan support device that supports a power demand/supply adjustment power procurement plan of a power system through a power transaction in the power market, the device comprising:
an added power transmission capacity analysis device that obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity; and
a target power transmittable capacity determination device that determines a target power transmittable capacity for minimizing the total procurement cost from a current power transmittable capacity and a power supply plan, based on the added power transmission capacity obtained from the added power transmission capacity analysis device.

2. The power demand/supply adjustment power procurement plan support device according to claim 1, further comprising:
a power system stabilization settling parameter creation device that creates a power system stabilization settling parameter for performing power system stabilization measures based on the target power transmittable capacity.

3. The power demand/supply adjustment power procurement plan support device according to claim 2, wherein
the power system stabilization settling parameter creation device determines an electric control power supply and an electric control amount by the power system stability determination.

4. The power demand/supply adjustment power procurement plan support device according to claim 1, wherein
the added power transmission capacity analysis device performs added power transmission capacity analysis on a power transmittable capacity of each consignment route of the power system and a power supply amount of each power supply in the total procurement cost of the power demand/supply adjustment power to obtain an added power transmission capacity of the power transmittable capacity of each consignment route and the power supply amount of each power supply to minimize the total procurement cost.

5. The power demand/supply adjustment power procurement plan support device according to claim 1, wherein
the target power transmittable capacity determination device determines the target power transmittable capacity by adding the added power transmission capacity to the current power transmittable capacity of the consignment routes.

6. The power demand/supply adjustment power procurement plan support device according to claim 1, wherein
the added power transmission capacity analysis device sets the added power transmission capacity as an added power supply amount with respect to a procurement amount of a power supply of adjustment power.

7. The power demand/supply adjustment power procurement plan support device according to claim 1, wherein
a power system diagram is drawn so that a current power transmittable capacity and a target power transmittable capacity for each consignment route in the power system can be compared with each other.

8. The power demand/supply adjustment power procurement plan support device according to claim 1, wherein
the added power transmission capacity for each consignment route in the power system is output using a numerical value and other visually distinguishable expressions.

9. A power demand/supply adjustment power procurement plan support device that supports a power demand/supply adjustment power procurement plan of a power system through a power transaction in the power market, the device comprising:
an added power transmission capacity analysis device that obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity;
a target power transmittable capacity determination device that determines a target power transmittable capacity for minimizing the total procurement cost from a current power transmittable capacity and a power supply plan, based on the added power transmission capacity obtained from the added power transmission capacity analysis device; and
a power system stabilization settling parameter creation device that creates a power system stabilization settling parameter for performing power system stabilization measures based on the target power transmittable capacity.

10. A power demand/supply adjustment power procurement plan support system comprising:
a power market management device that performs management and operation of a transaction in a power market; and a power demand/supply adjustment power procurement plan support device that supports a power demand/supply adjustment power procurement plan of the power system through a power transaction in the power market, wherein
the power demand/supply adjustment power procurement plan support device includes an added power transmission capacity analysis device that obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, which are obtained from the power market management device, and performs added power transmission capacity analysis on a power transmittable capacity of each consignment route of the power system and the power supply amount of each power supply in the total procurement cost of the power demand/supply adjustment power to obtain an added power transmission capacity, and
a target power transmittable capacity determination device that determines a target power transmittable capacity for minimizing the total procurement cost from a current power transmittable capacity and a power supply plan, based on the added power transmission capacity obtained from the added power transmission capacity analysis device.

11. The power demand/supply adjustment power procurement plan support system according to claim 10, further comprising:
a central power supply command device that performs planning of the supply of electric power or gives a power supply command with respect to the power demand of the power system, wherein
the power demand/supply adjustment power procurement plan support device includes
an added power transmission capacity analysis device that obtains actual power supply data including a power supply having supplied power to a power system and an actual value of a power supply amount, which are obtained from the central power supply command device, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity, and
a target power transmittable capacity determination device that determines a target power transmittable capacity for minimizing the total procurement cost from a current power transmittable capacity and a power supply plan, based on the added power transmission capacity obtained from the added power transmission capacity analysis device, and
the central power supply command device performs planning of the supply of electric power or gives a power supply command with respect to power demand of the power system according to the target power transmittable capacity determined by the target power transmittable capacity determination device and sends the actual power supply data to the power demand/supply adjustment power procurement plan support device.

12. The power demand/supply adjustment power procurement plan support system according to claim 10, further comprising:
a power system stabilization device that secures system stability at the time of an accident of a power system, wherein
the power demand/supply adjustment power procurement plan support device includes
an added power transmission capacity analysis device that obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, which are obtained from the power system stabilization device and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity, a target power transmittable capacity determination device that determines a target power transmittable capacity for minimizing the total procurement cost from a current power transmittable capacity and a power supply plan, based on the added power transmission capacity obtained from the added power transmission capacity analysis device, and a power system stabilization settling parameter creation device that creates a power system stabilization settling parameter for performing power system stabilization measures based on the target power transmittable capacity, and the power system stabilization device secures system stability at the time of an accident of a power system according to the power system stabilization settling parameter determined by the power system stabilization settling parameter creation device and sends the actual power system stabilization data including a power supply performing power supply restriction for power system stabilization and an electric control amount, or an electric power customer facility performing a load restriction and an actual value of a load control amount to the power demand/supply adjustment power procurement plan support device.

13. A power demand/supply adjustment power procurement plan support method for supporting a power demand/supply adjustment power procurement plan of a power system through a power transaction in a power market, the method comprising:

obtaining actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performing added power transmission capacity analysis on a power transmittable capacity of each consignment route of the power system and the power supply amount of each power supply in the total procurement cost of the power demand/supply adjustment power to obtain an added power transmission capacity; and determining a target power transmittable capacity for minimizing the total procurement cost from a current power transmittable capacity and a power supply plan, based on the added power transmission capacity.

14. A power demand/supply adjustment power procurement plan support method using a power market management device that performs management and operation of transaction in a power market, and a power demand/supply adjustment power procurement plan support device that supports a power demand/supply adjustment power procurement plan of a power system through a power transaction in the power market, wherein the power demand/supply adjustment power procurement plan support device obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, which are obtained from the power market management device, and performs added power transmission capacity analysis on a power transmittable capacity of each consignment route of the power system and the power supply amount of each power supply in the total procurement cost of the power demand/supply adjustment power to obtain an added power transmission capacity, and determines a target power transmittable capacity for minimizing the total procurement cost from a current power transmittable capacity and a power supply plan, based on the added power transmission capacity.

15. The power demand/supply adjustment power procurement plan support method according to claim 14 using a power system stabilization device that secures system stability at the time of an accident of a power system, wherein the power demand/supply adjustment power procurement plan support device obtains actual power supply data including a power supply having supplied power to a power system and an actual value of a power supply amount, actual power system stabilization data including a power supply performing power supply restriction for power system stabilization and an electric control amount, or an electric power customer facility performing a load restriction and an actual value of a load control amount, which are obtained from the power system stabilization device, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity, determines a target power transmittable capacity for minimizing the total procurement cost from a current power transmittable capacity and a power supply plan based on the added power transmission capacity, and creates a power system stabilization settling parameter for performing power system stabilization measures, based on the target power transmittable capacity, and the power system stabilization device secures system stability at the time of an accident of a power system according to the power system stabilization settling parameter and sends the actual power system stabilization data including a power supply performing power supply restriction for the power system stabilization and an electric control amount, or an electric power customer facility performing a load restriction and an actual value of a load control amount to the power demand/supply adjustment power procurement plan support device.

16. The power demand/supply adjustment power procurement plan support method according to claim 14 using a central power supply command device that performs planning of the supply of electric power or gives a power supply command with respect to the power demand of the power system, wherein the power demand/supply adjustment power procurement plan support device obtains actual power supply data including a power supply having supplied power to a power system and an actual value of a power supply amount, which are obtained from the central power supply command device, actual power system stabilization data including a power supply performing power supply restriction for power system stabilization and an electric control amount, or an electric power customer facility performing a load restriction and an actual value of a load control amount, and actual power demand/supply adjustment power procurement data including a procurement amount of power demand/supply adjustment power of a power supply participating in the power market and an actual value of a total procurement cost, and performs added power transmission capacity analysis on a power transmittable capacity of each consignment route of the power system and the power supply amount of each power supply in the total procurement cost of the power demand/supply adjustment power to obtain an added power transmission capacity, and determines a target power transmittable capacity for minimizing the total procurement cost from a current power transmittable capacity and a power supply plan, based on the added power transmission capacity, and the central power supply command device performs planning of the supply of electric power or gives a power supply command with respect to the power demand of the power system according to the target power transmittable capacity and sends the actual power supply data to the power demand/supply adjustment power procurement plan support device.

\* \* \* \* \*